Feb. 5, 1963 C. E. ADAMS 3,076,414
FLUID PRESSURE ENERGY TRANSLATING DEVICES
Filed April 21, 1958 4 Sheets-Sheet 1

INVENTOR.
CECIL E. ADAMS
BY Donald J. Detrich,
AGENT

Feb. 5, 1963 C. E. ADAMS 3,076,414
FLUID PRESSURE ENERGY TRANSLATING DEVICES
Filed April 21, 1958 4 Sheets-Sheet 2

INVENTOR.
CECIL E. ADAMS
BY *Donald J. Petrich,*
AGENT.

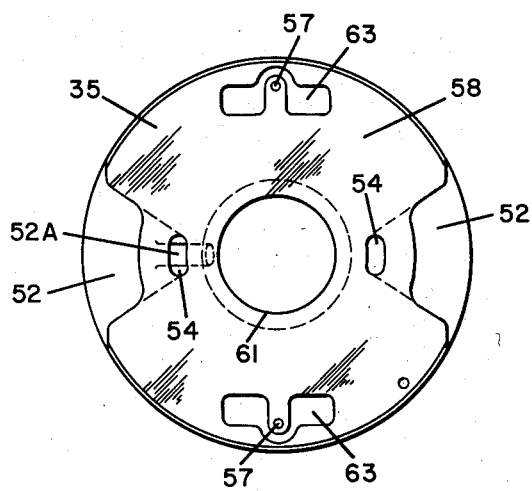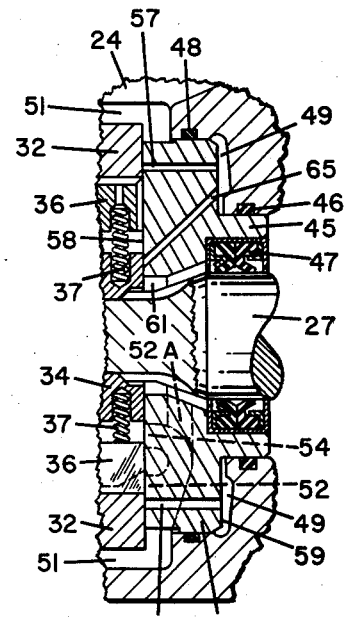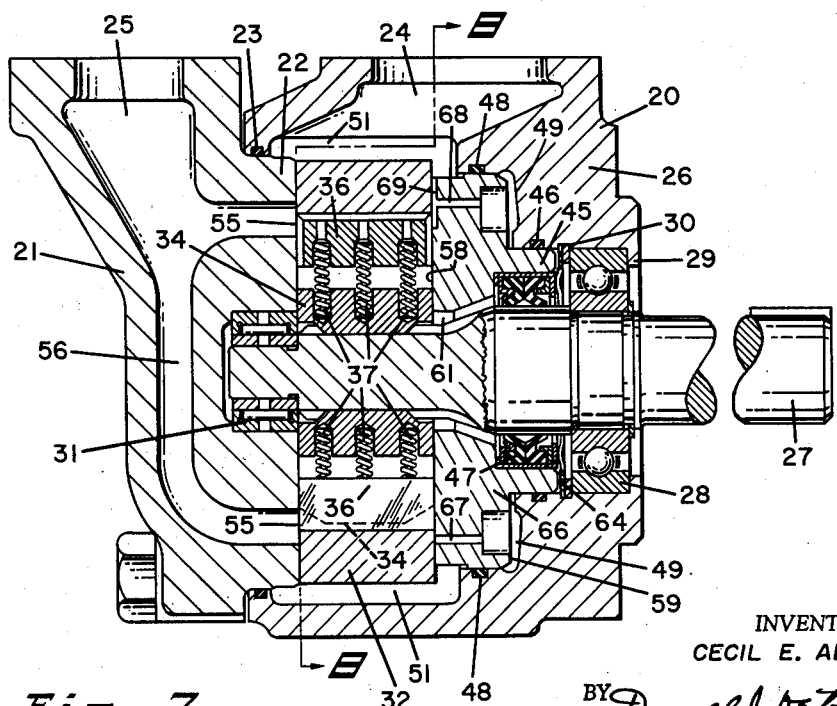

INVENTOR.
CECIL E. ADAMS

United States Patent Office 3,076,414
Patented Feb. 5, 1963

3,076,414
FLUID PRESSURE ENERGY TRANSLATING DEVICES
Cecil E. Adams, Columbus, Ohio, assignor to American Brake Shoe Company, New York, N.Y., a corporation of Delaware
Filed Apr. 21, 1958, Ser. No. 729,777
6 Claims. (Cl. 103—136)

This invention relates to fluid pressure energy translating devices such as fluid pumps and motors, and more particularly it relates to improvements in that kind of such devices which includes a stator encompassing or surrounding rotary elements and in which there is a head or cheek plate means urged, at least in part, axially toward the stator and rotary elements by fluid under pressure.

The main object of the invention is to provide improved structure in devices of the kind set forth above whereby friction between parts thereof may be reduced to a minimum and lubrication between moving parts thereof will be assured particularly at the time that fluid is first caused to flow under pressure through the device.

Another object of the invention is to provide improved structure in fluid energy translating devices of the kind described above which will prevent the device from operating under full fluid pressure loads should the device be operated in an overheated condition and which will automatically and gradually increase the fluid pressure loads at which the device will operate as the device or internal parts of it cool.

Another object of the invention is to provide improved structure in fluid energy translating devices of the kind described above whereby the fluid pressures acting on opposite sides of the head or cheek plate thereof may be balanced exactly or in any predetermined ratio when the device is operating under constant load.

Still another object of the invention is to provide improved structure in fluid pressure energy translating devices of the kind described whereby when the translating device is subjected to sudden increases or shock loads, a head or cheek plate thereof will be moved by the sudden increases in pressure within the device and at one side of the movable head or cheek plate to cause the device to by-pass fluid and then to reduce the by-passing gradually thereby eliminating severe shocks and strains upon the parts of the translating device.

Further object and advantages of the present invention will be apparent from the following description, reference being had to the accompanying drawings wherein a preferred form of embodiment of the invention is clearly shown.

In the accompanying drawings:

FIG. 5 is a view in elevation of the movable head, port plate or cheek plate of the pump seen in FIG. 1, the view illustrating particularly the fluid ports and passages therein;

FIG. 6 is a view in section of a fragment of a pump similar to that shown in FIG. 1, but which includes a different movable head, port plate or cheek plate in which there is an exhaust bore that leads from a pressure chamber at one side of the cheek plate to that side thereof which is adjacent one side of the rotor;

FIG. 7 is a view in section of a pump similar to that seen in FIG. 1 but which includes still another movable head, port plate or cheek plate having structure by which the invention is embodied into the pump in a different form;

The invention herein described and claimed is applicable to gear and vane type fluid pressure energy translating devices and in fact may be employed with advantage in any fluid pressure energy translating device which includes a bushing, head, port plate or cheek plate, the position of which may be determined by fluid pressures. While the invention is described and illustrated herein in connection with a vane type hydraulic pump, it is to be understood that it is not to be interpreted as being limited to a device of this type.

Fluid energy translating devices such as pumps have long been known which are of a type that include a stator which encompasses or surrounds a rotor and in which there is an end bushing, head, port plate or cheek plate which forms a wall at one side of the stator and rotor and is urged toward them by a spring and fluid pressure means. When these known devices are pumping fluid, the cheek plate is urged toward the rotor and stator by fluid pressure so that the cheek plate is clamped very tightly to the stator so as to seal therewith to prevent positively any flow of fluid between the cheek plate and stator.

By this invention, when the pump is pumping fluid, the pressures on the opposite sides of the floating bushing, head, port plate or cheek plate may be balanced to any desired degree or the pressures may be substantially completely balanced whereby a spring may be employed to exert the sole force to hold the floating cheek plate lightly against the stator and rotor. Also by this invention, when the pump first starts to pump fluid the cheek plate may be caused to throb, at least once, away from the stator and rotor thereby separating the pumping elements in an axial direction to insure that fluid will enter between the rotating parts of the pump just before it begins to operate to produce full fluid pressure at its exhaust port. For reasons set forth hereinafter, this lubricating feature is particularly important when the pump is first primed and/or when the pump is caused to start to pump fluid which is at a low temperature.

Figure 1:
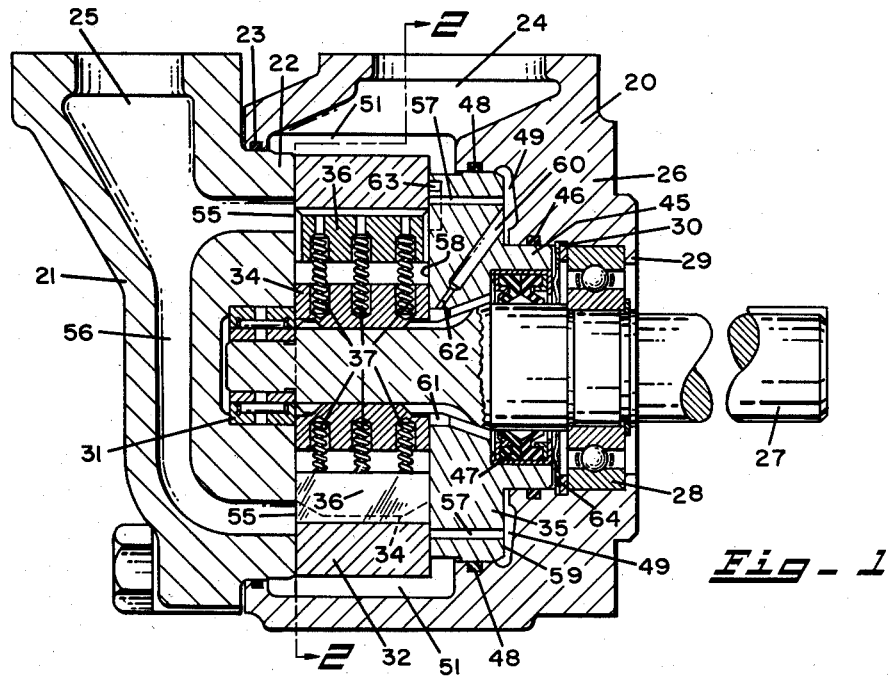
FIG. 1 is a view in section of a fluid energy translating device of the kind set forth in the objects which includes the invention, the particular device shown being a hydraulic pump.
Figure 2:
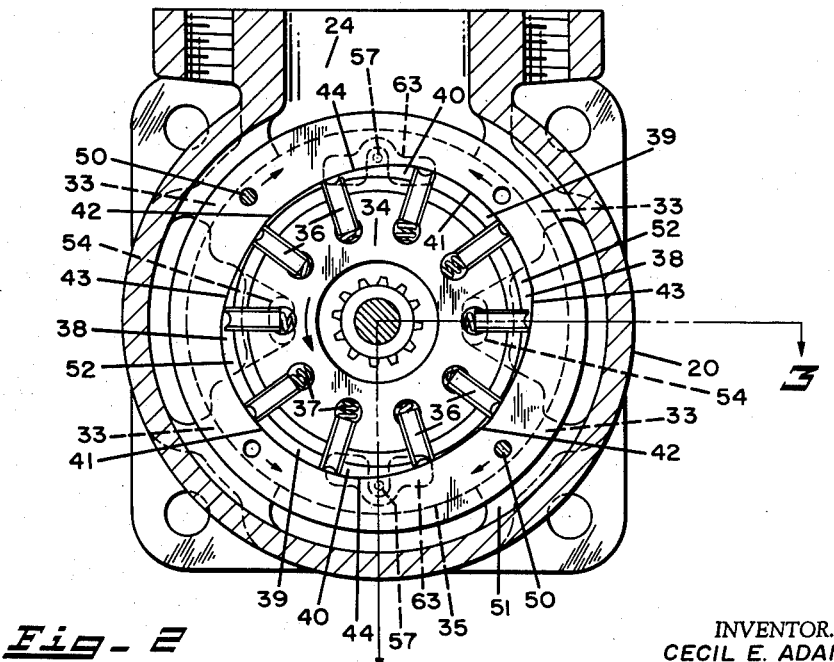
FIG. 2 is a view in section, the section being taken on line 2—2 of FIG. 1.

The pump seen in FIGS. 1 and 2 of the drawings includes a body, casing or housing formed by a casting 20 having a generally cylindrical hollow interior and an end cap or block 21 having a cylindrical boss portion 22 which telescopes into the open end of the casting 20 and is sealed therewith by an O-ring 23 received in a groove in the casting 20. The end cap or block 21 is secured to the casting 20 by four screws, one of which is seen in FIG. 1, and it may be rotated to and secured in any one of four positions with respect to the casting 20. By this arrangement the relative radial or rotated positions of the inlet, low pressure or suction port 24 in the casting 20 and the high pressure, exhaust or outlet port 25 in the end cap 21 may be changed with respect to one another.

The end wall 26 of the casting 20 opposite the cap or block 21 includes a bore through which the pump shaft 27 extends. Shaft 27 is supported for rotation in the bore by a ball bearing 28 which is secured against axial movement in the bore by a flange 29 on the casting and a snap ring 30 which is received in a groove in the housing. The end of the shaft 27 which is within the housing is carried for rotation in a needle type roller bearing 31 mounted in a central bore or recess in the end cap or block 21.

The end of the boss portion 22 of the end cap or block 21 is finished to form a flat cheek or port plate surface which abuts a flat end surface of a cam ring 32 and through which the cam ring 32 is clamped axially rigidly against four lugs 33 (see FIG. 2) formed in the interior of the casting 20. It may be mentioned here that the casing or housing and the cam ring are frequently termed in the art as the stator of the pump unit and that frequently the cam ring per se is termed the stator. It is, therefore, to be understood that the term stator as employed in the claims hereof is to be construed as meaning the combination of the housing and cam ring, the cam ring per se or the equivalent elements in any unit wherein the housing and stator are made integral as is sometimes done in the art.

The cam ring 32 encircles or encompasses a rotor 34 which is mounted upon the shaft for relative axial movement with respect thereto through a spline joint connection. The width of the rotor 34 is no greater than and is preferably of the order of one and one-half thousandths of an inch less than the axial thickness of the cam ring 32 in order that it may rotate when the pump is pumping fluid without undue friction between itself and the pump end heads, port plates or cheek plates which are formed by the end or cheek plate face, wall or surface of the end cap or block 21 and a floating cheek plate 35 which will be described in detail hereinafter. The rotor is provided with a plurailty of radially extending vane slots in each of which there is a vane 36 that is urged radially outwardly against the inner surface of the cam ring 32 by springs 37.

The cam ring 32 has a cylindrical external surface and its inteior surface is generally elliptical to provide a balanced type pump in which there are diametrically opposite low pressure or suction zones 38, fluid transfer zones 39 and high pressure or exhaust zones 40 (see FIG. 2). In order to provide these zones, the interior or cam surface of the cam ring 32 is formed in part upon two arcs 41 of equal radii struck from the axis of the shaft 27 which arcs extend across the transfer zones 39 between the suction and pressure zones 38 and 40, respectively, and two arcs 42 of equal radii but of less length than the first-mentioned radii struck from the axis of the shaft 27 and which arcs 42 are substantially tangent to the rotor 34 and extend one between each of the adjacent suction and pressure zones 38 and 40, respectively. The arcs 41 and 42 are connected by cam portions or surfaces 43 and 44.

The cheek plate 35 is a disk finished to a smooth flat cheek plate surface 58 on the side thereof which abuts the cam ring 32 and it is provided with a central bore 61 surrounded by a cylindrical boss 45 which extends into the bore in the end wall 26 of the casting 20 and is sealed thereto by an O-ring 46 contained in a groove in the casting. The central bore in the cheek plate 35 receives an oil seal 47 which engages the shaft 27 and prevents the loss of fluid therearound to the outside of the casing or housing of the pump as well as preventing the entrance of air to the interior of the casing. The radially outermost or cylindrical peripheral surface of the cheek plate 35 is sealed to the casting 20 by means of an O-ring 48 and the cheek plate 35 cooperates with the casting to provide a pressure chamber 49, the cheek plate 35 functioning in the nature of an axially movable, non-rotatable piston in said chamber.

From the foregoing description, it will be seen that the flat cheek plate surface of the end cap or block 21 abuts and seals with one end of the cam ring 32 and that the end cap or block 21 clamps the cam ring 32 axially against the lugs 33 which are formed on the interior of the casting 20. The cam ring 32 is thus unsupported through its peripheral surface against radial movement by the casing and support against this movement is obtained by the clamping action of the end cap 21 and the lugs 33. Dowel pins 50 extend into bores formed in the cam ring, the end cap 21 and the cheek plate 35. These pins 50 and their respective bores function to align the end cap 21, cam ring 32 and cheek or port plate 59 when the pump is being assembled and to prevent rotation of the cheek or port plate 59 during operation of the pump. The pins 50 and their bores are so arranged that the cam ring may be held between the end cap 21 and the port or cheek plate 35 in either of two positions, one providing for clockwise rotation of the shaft 27 and the other providing for its counter-clockwise rotation. To change the position of the cam ring 32, and thus the direction of rotation of the shaft 27, the end cap 21 and bearing 31 are removed from the casting 20 after which the cam ring 32, rotor 34 and vanes 36 are removed from the casting 20 and shaft 27 as a unit. The dowel pins 50 are then placed in proper bores in the cam ring 32 and the cam ring, rotor and vanes are replaced in the casting 20 and the end cap 21 is secured in place. The dowel bores in the cam ring 32 are so arranged that, when the above described steps are followed, the major axis of the cam ring will be rotated through an angle of ninety degrees.

The mounting features of the cam ring are described and claimed in my copending application Serial No. 730,154, filed April 22, 1958, for improvements in "Fluid Pressure Energy Translating Devices," now Patent No. 3,012,511.

Figure 3:
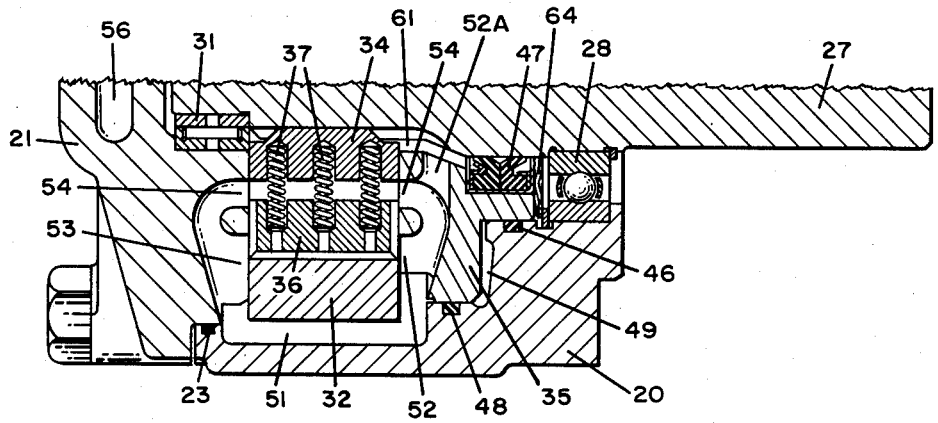
FIG. 3 is a view in section, the section being taken on line 3—3 of FIG. 2 and showing particularly the arrangement of suction or inlet ports in the pump.

The suction or inlet passageway through which fluid flows into the pump from the port 24 includes an annular recess or groove 51 formed within the casing and surrounding the cam ring 32. This recess or groove 51 cooperates with the cylindrical exterior surface of the boss portion 22 of the end cap 21, the cylindrical exterior surface of the cam ring 32 and the peripheral surface of the cheek plate 35 to form a passageway which encompasses the pumping apparatus of the unit. When the pump is operating, fluid flows from the main inlet or suction port 24 to the passageway or groove 51 and circumferentially around the cam ring 32 to two points spaced one hundred and eighty degrees apart at which points the fluid flows axially and around the cam ring 32 and enters an inlet or suction port 52 formed in the cheek plate 35 and an inlet or suction port 53 formed in the end cap or block 21 (see FIG. 3). The ports 52 in the cheek plate 35 are axially aligned with the ports 53 in the end cap or block 21 and these ports are identical in shape. Each pair of the ports 52 and 53 opens into a suction zone 38 adjacent a cam portion 43 of the cam ring 32 when the cam ring 32 is in the position shown in FIG. 2 of the drawings. When the cam ring is rotated ninety degrees, in the manner previously described, to provide for reverse rotation of the shaft 27, the pressure zones 40 become suction zones and the ports 52 and 53 open into them. Each of the ports 52 and 53 also includes a radial extension which terminates in a port 54 by which fluid is admitted to the bottoms of the vane slots in the rotor 34 as the slots pass the ports 54.

Figure 4:
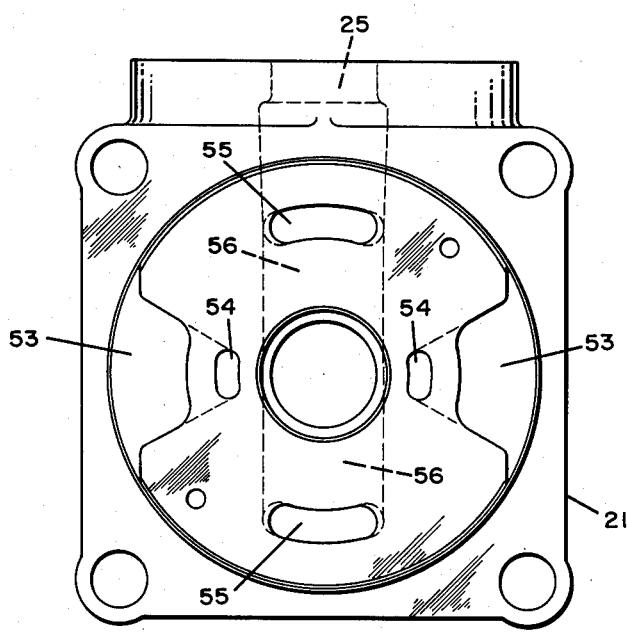
FIG. 4 is a view in elevation of the end head or cap of the pump seen in FIG. 1, the view illustrating particularly the fluid ports and passages therein.

The end cap or block 21 also includes two high pressure or exhaust ports 55 which are spaced one hundred and eighty degrees apart and at ninety degrees with respect to each of the inlet or suction ports 53 (see FIG. 4) and these ports 55 are connected with the main exhaust or high pressure outlet port 25 of the pump by a passageway 56 formed in the end cap 21.

From the foregoing description, it will be seen that the fluid being pumped enters the pump at the main inlet or suction port 24, flows circumferentially around the cam ring 32 in the groove 51 in two directions and then divides over the ends of the cam ring 32 to enter the ports 52 and 53 and flows through these ports into the suction zones 38. It will also be seen that the vanes of the pump move the fluid from the suction zones 38 across the transfer zones 39 and cause it to be displaced from the pressure zones 40 into the exhaust ports 55 and from the pump through the passageway 56 and main exhaust port 25.

In the embodiment of the invention illustrated in FIGS. 1 through 5 of the drawings, the cheek plate 35 is provided with two bores 57 which extend axially through the cheek plate from the flat cheek plate surface 58 thereof to that end surface 59 of the plate which is in the pressure chamber 49. These passageways 57 are spaced one hundred and eighty degrees apart and are at such radial distances from the axial center of the cheek plate 35 that their mouths or ends in the cheek plate surface 58 will be covered by the adjacent flat end of the cam ring 32 when the cheek plate is urged against the latter. It will be seen that the mouths or ends of the bores or passageways 57 in the cheek plate surface 58 cooperate with the flat end surface of the cam ring 32 to form a pair of valves. The operation and function of these valves will be described more fully hereinafter.

The cheek plate 35 also includes a stepped bore or passageway 60 which leads at an angle from the surface 59 thereof to the central bore 61 in the cheek plate. This bore or passageway 60 constitutes an exhaust passageway through which fluid may escape from the pressure chamber 49 to a region of lower pressure which in this case is at the central bore 61 of the cheek plate 35 which is open through a drain passageway 52A in the cheek plate that communicates with one of the suction ports 52 therein. The stepped bore 60 includes a small diameter restrictor or orifice portion 62 through which a small amount of fluid escapes from the pressure chamber 49.

The bores 57 are arranged in the cheek plate 35 in such manner that they will abut the side of the cam ring 32 at positions which are adjacent the pressure zones 40 when the cam ring is in the position shown in FIG. 2 of the drawings and so that when the cam ring is rotated ninety degrees in the manner hereinbefore described to reverse the direction of rotation of the shaft 27 they will be adjacent the zones 38 which become pressure zones when the cam ring is shifted to its new position. As indicated in FIGS. 1, 2 and 5 of the drawings, the mouths of the bores 57 are partially surrounded by channels, grooves or depressions 63 formed as by casting in the cheek plate surface side of the cheek plate 35. As indicated in FIG. 2 of the drawings, these channels 63 extend radially inwardly in the cheek plate 35 such distance that their ends communicate with the high pressure zones 40 whereby there will be an area defined by the shape of the channels 63 which surrounds those sides of the mouths of the bores 57 which are remote from the pressure zones 40. The channels 63 are not necessary to the functioning of the invention but their presence is preferred since they provide means which permit fluid to flow from the pressure zones 40 substantially radially with respect to the mouth of each of the bores 57 when the cheek plate 35 is moved away from the end surface of the cam ring 32.

When the pump described is first placed in operation, it is, of course, necessary that it prime itself, that is, fill itself with fluid before it can develop operating pressures at its main exhaust outlet or port 25. It frequently occurs that the rotor of the pump may have to make many revolutions before it receives sufficient fluid to prime itself and consequently adequately lubricate and cool itself. This action may also occur when the pump is started and the fluid which the pump is required to pump is cold since under this condition the viscosity of the fluid may be high due to the low temperature of the fluid and the pump may cavitate, i.e., its rotor may rotate at its operating speed while insufficient fluid flows into the pump to fill it with fluid. It will be seen that in the pump described the port or cheek plate 35 is urged toward the adjacent end of the cam ring 32 only by a light washer type spring 64 which abuts the end of the boss portion 45 of the cheek plate 35 and the snap ring 30 and that, therefore, should the rotor and vanes expand due to insufficient lubrication and cooling they can move the port or cheek plate 35 axially in a direction away from the cam ring 35 whereby excessive friction between themselves and the cheek plate and galling or seizing of the relatively rotating elements of the pump will be prevented. It will also be seen that when the pump primes itself, that is, becomes filled with fluid that there will be a sudden surge or surges of pressure within the pressure zones 40 and that since that at this time there will be a lower, probably atmospheric, pressure existing in the chamber 49 that the high pressure in the zones 40 will act upon the cheek plate to cause it to throb or move away from both the cam ring 32 and the rotor 34 at least once and permit fluid to enter between the ends of the vanes 36 and rotor 34 and the adjacent cheek plate surfaces to provide a flash of fluid lubricant and coolant to enter between these elements thereby further obviating the possibility of galling and seizing of the elements due to increased friction caused by a sudden work load being placed upon the pump.

The structure and arrangement of the port or cheek plate 35 and its internal bores or passageways insures that the sudden surges of pressure in the pressure zones 40 will not be conveyed immediately to the pressure chamber 49 and therefore the movement of the cheek plate away from the cam ring and rotor will be assured when the pump primes itself. Should the expansion of the rotor and vanes be of such magnitude as to separate the cheek plate from the cam ring there will, of course, be provided a space between these elements through which some fluid from the pressure zones 40 will be by-passed directly to the low pressure suction passageway 51 and the pump can not operate under full load until its parts have cooled sufficiently to permit the cheek plate to move toward the cam ring to restrict or close this by-pass means.

In the pumps illustrated herein, the total area on the cheek plate surface 58 of the cheek plate 35 which is exposed to the pressure in the high pressure zones 40 is approximately two-thirds that of the area of the end surface 59 thereof which is exposed to pressure in the pressure chamber 49. This ratio may, of course, be varied and variations therein may be determined in part by the pressure differential which it is desired to maintain between the pressure zones 40 and the pressure chamber 49 and in part by the arrangement and sizes of the passageways by which fluid is permitted to enter and pass from the chamber 49.

When the pump is pumping fluid under normal conditions, that is, when it has properly primed itself and its rotor and vanes are not holding the cheek plate 35 away from the adjacent end of the cam ring 35, then the pressure in the pressure zones 40 will be such that the cheek plate 35 will be moved or positioned very slightly from the adjacent end surface of the cam ring 32 thus causing the valves formed by the mouths of the two bores 57 and the adjacent side of the cam ring 32 to be opened slightly, i.e., to be cracked, and fluid from the high pressure zones 40 will flow through the bores 57 into the pressure chamber 49. Some fluid can flow from the pressure chamber 49 through the passageway 60 and orifice 62 so that there will be a slight flow of fluid through the pressure chamber whenever fluid is entering it through the bores 57. The diameter and length of the orifice 62 is, of course, such that after the attainment of a predetermined flow of fluid through the bores 57 pressure will be built up in the pressure chamber 49 and this pressure, which is always lower than the pressure in the zones 40, aids the spring 64 in urging the cheek plate toward the cam ring 32 and rotor 34. The orifice 62 serves to relieve pressure in the chamber 49 when the output pressure of the pump is reduced and it provides for a continuous flow of a small volume of fluid through the chamber 49 whenever the pump is pumping fluid. The amount of fluid flowing through the chamber 49 is too little to be detrimental to the volumetric efficiency of the pump.

From the foregoing, it will be seen that the port or cheek plate 35 will float axially with respect to both the cam ring and rotor and that its position with respect to them will be determined by the difference in pressure between the pressure zones 40 and the pressure chamber 49. The normal operating position of the cheek plate 35 with respect to the cam ring 32 is such that the cheek plate 35 is in "light kissing contact" with the cam ring 32 in order that there will always be a flow of fluid from the pressure zones 40 to the mouths of the bores 57 and some slight but negligible by-passing of fluid from the pressure zones 40 into the suction passageway 51.

It is to be understood that it is within the scope of this invention to remove some of the metal adjacent the mouths of the bores 57 to provide for a small flow of fluid from the pressure zones 40 to the bores 57 while permitting the cheek plate 35 to seat upon the adjacent end of the cam ring whereby there will be no by-passing of fluid from the pressure zones 40 to the suction passageway 51 when the pump is operating under normal conditions.

The above described structure also reduces shock strains on the vanes and shaft of the device since upon any sudden increase in pressure in the pressure zones the cheek plate 35 will be moved away from the cam ring to permit by-passing of fluid from the pressure zones 40 to the suction passageway 51 after which the cheek plate will be moved toward the cam ring at a rate which is determined by the rate of increase in pressure in the chamber 49 which is caused by fluid entering it through the opened valves at the mouths of the bores 57.

FIG. 6 of the drawings illustrates another form which the passageway through which fluid escapes from the pressure chamber 49 may have. In this form, the passageway includes a bore 65 which leads from the surface 59 of the cheek plate and opens through the cheek plate surface 58 at a position adjacent one end of the rotor 34 and near the center thereof. This form of passageway may be preferred when there is a likelihood that the fluid being pumped by the pump may contain foreign particles which would plug the orifice 62 since in this arrangement the side of the rotor 34 cooperates with the outlet end of the bore or passageway 65 to form an orifice and the rotating end surface fo the rotor wipes away from the orifice any fine particles of matter which might otherwise accumulate and plug the passageway 65.

Figure 8:
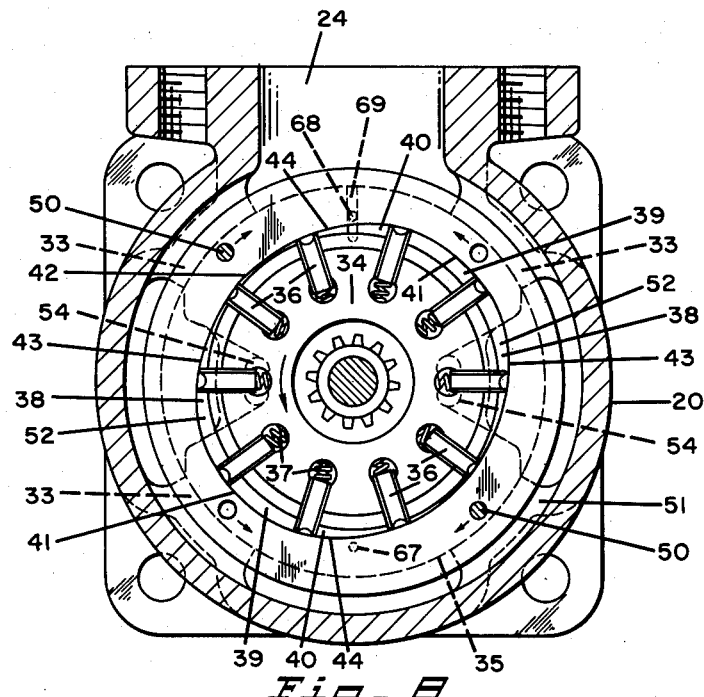
FIG. 8 is a view in section, the section being taken on line 8—8 of FIG. 7.
Figure 9:
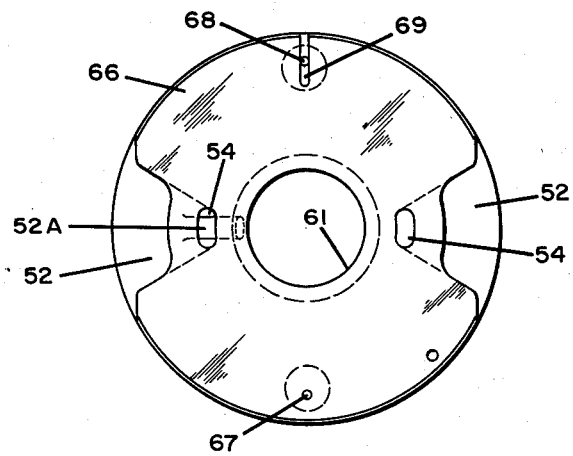
FIG. 9 is a view in elevation of the movable head, port plate or cheek plate of the pump seen in FIG. 7, the view showing particularly another form of passage means by which the pressure chamber of the pump is connected to zones of high and low pressures.

The invention is illustrated in a modified form in FIGS. 7 through 9 of the drawings and except as described hereinafter the pump and elements shown in these figures correspond in structure with those of the pump shown in FIGS. 1 through 5 and the same numerals are employed to indicate identical parts thereof.

In the pump which includes the invention in the form now being described, the floating cheek plate 35 is substituted by a cheek plate 66 which is identical in all respects with the cheek plate 35 except for the construction of the passageway and valve means by which fluid is admitted to the pressure chamber 49 and the fact that it does not include either of the passage means 60 or 65 shown in FIGS. 1 and 6, respectively. In this embodiment of the invention, the cheek plate 66 is provided with two bores 67 and 68 which correspond with the bores 57 in FIG. 1 and which carry out the same functions as these bores. The bore 67 terminates in a mouth formed in the cheek plate surface 58 and it is not, although it may be, surrounded by a channel or groove which is the equivalent of one of the channels or grooves 63. The other bore 68 terminates at a radial cut, scratch or groove 69 which is preferably formed in the cheek plate 66 as shown and which extends radially from one of the pressure zones 40 to the suction passageway 51.

The operation of this pump is substantially the same as that of the pump previously described but in this device there will not be a continuous flow of fluid through the pressure chamber 49, but there will always be a flow of fluid from one of the pressure zones 40 through the cut, scratch or groove 69 to the suction passageway 51. The radial position, that is the radial position or spacing outwardly from the adjacent cam surface 44 at which the bore 68 intersects the cut, scratch or groove 69 may be employed to determine the pressure differential that will normally be maintained between opposite ends of the cheek plate 66. In this embodiment, the fundamental function of the bore 68 is to constitute a passageway for pressure and exhaust from between the cut, scratch or groove 69 and the interior of the pressure chamber 49 and to supply fluid to the chamber 49 to replace any fluid which may be lost therefrom by reason of leakage past the O-ring seals 46 and 48.

In this embodiment, the function of the cut, scratch or groove 69 and the bore 68 may be compared with that of an electric potentiometer in that the greater the distance the mouth or entryway of the bore 68 is spaced from the entrance of the cut, scratch or groove 69 the less the pressure in the pressure chamber 49 will be. It will thus be seen that the distance that the mouth or entrance of the bore 68 is spaced along the groove 69 radially outwardly from the adjacent cam surface 44, the size, i.e., the cross-sectional area of the groove and the total length of the groove are variables which may be changed as desired to predetermine the pressure which will exist in the pressure chamber when the pump is operating to deliver fluid from its main outlet or exhaust port.

The diameter of the bore 68 is such that it will not become plugged by particles of foreign materials contained in the fluid which is circulating through the pump and because of the throbbing and other axial movements of the cheek plate 66 during the operation of the pump the cut, scratch or groove 69 will always be maintained clear and free of such particles. The action of the cheek plate 35 shown in FIG. 1 of the drawings also keep the mouth of the bore 57 clear of such foreign particles.

In both of the emdodiments illustrated in FIGS. 1 and 7 of the drawings, the actions or axial movements of the cheek plates 35 and 66 cause the valves formed by the bores 57 and 68 and the cam ring 32 to function as variable orifices to control the pressure in the pressure chamber 49.

While the form of embodiment of the present invention as herein disclosed constitutes a preferred form, it is to be understood that other forms might be adopted, all coming within the scope of the claims which follow.

I claim:

1. A fluid energy translating device having a zone of high pressure and a zone of low pressure, an inlet and an outlet for said zone of high pressure and zone of low pressure, said device including a housing, rotary translating means, a stator encompassing said translating means in said housing, a cheek plate which is movable in said housing with respect to said stator and said translating means in a direction parallel to the axis of said translating means, wall means defining a pressure chamber on the side of said cheek plate which is opposite to said translating means, said cheek plate forming one wall of said chamber, fluid under pressure in said chamber urging said cheek plate toward said stator and translating means, a restricted outlet constantly open at all times communicating between said chamber and said zone of low pressure, said restricted outlet being of such configuration as to normally maintain the pressure in said chamber intermediate the low pressure and the high pressure and sufficient to overbalance said cheek plate axially toward said rotary translating means and said stator, a fluid passage communicating between said zone of high pressure and said chamber, and valve means in said passage controlling the flow of fluid from said zone of high pressure to said chamber, said valve means being operated by axial movement of said cheek plate.

2. A fluid energy translating device having a zone of high pressure and a zone of low pressure and including a housing, an inlet and an outlet for said zone of high pressure and zone of low pressure, rotary translating means, a stator encompassing said translating means in said housing, a cheek plate which is movable in said housing with respect to said stator and said translating means in a direction parallel to the axis of said translating means, said cheek plate normally abutting said stator, wall means presented by said housing defining a pressure chamber on the side of said cheek plate which is opposite to said translating means, said cheek plate forming one wall of said chamber, fluid under pressure in said chamber urging said cheek plate toward said stator and translating means, a fluid passage in said cheek plate communicating between said zone of high pressure and said chamber, a restricted outlet in said cheek plate constantly open at all times communicating between said chamber and said zone of low pressure, said restricted outlet being of such configuration as to normally maintain the pressure in said chamber intermediate the low pressure and the high pressure and sufficient to overbalance said cheek plate axially toward said rotary translating means and said stator, and valve means in said passage controlling the flow of fluid from said zone of high pressure to said chamber, said valve means being opened by axial movement of said cheek plate away from said stator.

3. A fluid energy translating device having a zone of high pressure and a zone of low pressure and including a housing, an inlet and an outlet for said zone of high pressure and zone of low pressure, rotary translating means, a stator encompassing said translating means in said housing, a cheek plate which is movable in said housing with respect to said stator and said translating means in a direction parallel to the axis of said translating means, wall means defining a pressure chamber on the side of said cheek plate which is opposite to said translating means, said cheek plate forming one wall of said chamber, fluid pressure in said chamber urging said cheek plate toward said stator and translating means, a restricted outlet constantly open at all times communicating between said chamber and said zone of low pressure, said restricted outlet being of such configuration as to normally maintain the pressure in said chamber intermediate the low pressure and the high pressure and sufficient to overbalance said cheek plate axially toward said rotary translating means and said stator, a fluid passage communicating between said zone of high pressure and said chamber, and valve means in said passage controlling the flow of fluid from said zone of high pressure to said chamber, said valve means being formed in part by said stator and in part by said cheek plate and being operated by axial movement of said cheek plate.

4. A fluid energy translating device including a housing, rotary translating means, a stator encompassing said translating means in said housing, a zone of high pressure being defined between said stator and said translating means, a zone of low pressure, an inlet and an outlet for said zone of high pressure and said zone of low pressure, a cheek plate, said cheek plate being movable in said housing with respect to said stator and said translating means in a direction parallel to the axis of said translating means, said cheek plate normally abutting said stator, fluid pressure in said zone of high pressure urging said cheek plate away from said translating means and stator, wall means presented by said housing defining a pressure chamber on the side of said cheek plate which is opposite to said translating means, said cheek plate forming one wall of said chamber, fluid pressure in said chamber urging said cheek plate toward said stator, a fluid passage extending through said cheek plate from the surface thereof which normally abuts said stator to said chamber, said passage and stator thereby forming a normally closed valve for controlling the flow of fluid from said zone of high pressure to said chamber, said valve being opened by axial movement of said cheek plate away from said stator, and a restricted outlet constantly open at all times communicating between said chamber and said zone of low pressure, said restricted outlet being configurated to normally maintain the pressure in said chamber intermediate the low pressure and the high pressure and sufficient to overbalance said cheek plate axially toward said rotary translating means and said stator.

5. A hydraulic pump including, a stator, a rotor within said stator, a zone of high pressure and a zone of low pressure being defined between said stator and said rotor, an inlet and an outlet for said zone of high pressure and zone of low pressure, a cheek plate which is movable with respect to said stator and rotor in a direction parallel to the axis of said rotor, one side of said cheek plate normally abutting said stator, pressure in said zone of high pressure tending to urge said cheek plate away from said rotor, wall means defining a pressure chamber on the side of said cheek plate which is opposite to said rotor, said cheek plate forming one wall of said chamber, fluid pressure in said chamber urging said cheek plate toward said rotor, a restricted outlet constantly open at all times communicating between said chamber and said zone of low pressure, said restricted outlet being configurated to normally maintain the pressure in said chamber intermediate the low pressure and the high pressure and sufficient to overbalance said cheek plate axially toward said rotor and said stator, said cheek plate having a fluid passage extending through it from a point between the adjacent surfaces of said stator and cheek plate at a position adjacent said zone of high pressure to said chamber, said stator and cheek plate thereby forming a valve controlling the flow of fluid from said zone of high pressure to said chamber, said valve being opened by axial movement of said cheek plate away from said stator.

6. A hydraulic pump including, a stator, a rotor within said stator, a zone of high pressure and a zone of low pressure being defined between said stator and said rotor, an inlet and an outlet for said zone of high pressure and zone of low pressure, a cheek plate which is movable with respect to said stator and said rotor in a direction parallel to the axis of said rotor, one side of said cheek plate normally abutting said stator, pressure in said zone of high pressure tending to urge said cheek plate away from said rotor, said cheek plate separating said high pressure zone from said zone of low pressure, wall means defining a pressure chamber on the side of said cheek plate which is opposite to said rotor, said cheek plate forming one wall of said chamber, fluid pressure in said chamber tending to urge said cheek plate toward said rotor, a restricted fluid passage constantly open at all times formed between the abutting surfaces of said cheek plate and said stator, said restricted passage extending from said zone of high pressure to said zone of low pressure, and a passageway in said cheek plate communicating between said chamber and said restricted passage, said restricted passage being configurated to normally maintain the pressure in said chamber intermediate the low pressure and the high pressure and sufficient to overbalance said cheek plate axially toward said rotor and said stator.

References Cited in the file of this patent
UNITED STATES PATENTS

| | | |
|---|---|---|
| 1,780,109 | Berglund | Oct. 28, 1930 |
| 1,927,395 | Edwards | Sept. 19, 1933 |
| 2,405,061 | Shaw | July 30, 1946 |

(Other references on following page)

UNITED STATES PATENTS

| | | |
|---|---|---|
| 2,434,135 | Witchger | Jan. 6, 1948 |
| 2,437,791 | Roth et al. | Mar. 16, 1948 |
| 2,444,165 | Lauck | June 29, 1948 |
| 2,641,193 | Klessig | June 9, 1953 |
| 2,710,581 | Rosaen | June 14, 1955 |
| 2,742,862 | Banker | Apr. 24, 1956 |
| 2,763,216 | Klessig | Sept. 18, 1956 |
| 2,763,217 | Klessig et al. | Sept. 18, 1956 |
| 2,782,724 | Humphreys | Feb. 26, 1957 |
| 2,845,873 | Lapsley | Aug. 5, 1958 |
| 2,853,023 | English | Sept. 23, 1958 |
| 2,856,860 | Roth | Oct. 21, 1958 |
| 2,872,873 | Gardiner | Feb. 10, 1959 |
| 2,924,182 | Blasutta et al. | Feb. 9, 1960 |
| 2,956,512 | Brundage | Oct. 18, 1960 |

FOREIGN PATENTS

| | | |
|---|---|---|
| 1,135,979 | France | Dec. 22, 1956 |